United States Patent [19]

Leonard et al.

[11] Patent Number: 5,029,024
[45] Date of Patent: Jul. 2, 1991

[54] LOADER FOR MAGNETIC TAPE CARTRIDGES

[75] Inventors: Robert E. Leonard, Denver; Joseph A. Fryberger, Longmont; Lynn C. Jacobs, Louisville; Christian P. Marlow, Nederland, all of Colo.

[73] Assignee: Storage Technology Corporation, Louisville, Colo.

[21] Appl. No.: 489,474

[22] Filed: Mar. 5, 1990

[51] Int. Cl.$^5$ .............................................. G11B 15/68
[52] U.S. Cl. ..................................... 360/92; 360/98.06
[58] Field of Search ................... 360/92, 98.04–98.06, 360/69; 369/35, 36, 38–39; 414/788.7

[56] References Cited

U.S. PATENT DOCUMENTS

| | | | |
|---|---|---|---|
| 3,603,597 | 9/1971 | Haake | 360/92 |
| 4,835,634 | 5/1989 | Ostwald | 414/788.7 X |
| 4,839,758 | 6/1989 | Honjoh | 360/92 X |
| 4,918,548 | 4/1990 | O'Donnell et al. | 360/92 |

FOREIGN PATENT DOCUMENTS 62-134852  6/1987  Japan ..................................... 360/92

Primary Examiner—John H. Wolff
Attorney, Agent, or Firm—Dorr, Carson, Sloan & Peterson

[57] ABSTRACT

The loader for magnetic tape cartridges uses a receiver that holds a single magnetic tape cartridge or a companion cartridge magazine that holds a plurality of preloaded magnetic tape cartridges to individually access any one of the plurality of magnetic tape cartridges held by the magazine. The loader of the present invention is able to move a magnetic tape cartridge from the receiver or a magazine into the associate tape drive without the use of a friction feed drive. The loader contains only one motor for loading a magnetic tape cartridge from the magazine into the associated tape drive. The width of the loader is equal to or less than the width of the associated tape drive so that two loader-tape drive units can be mounted side by side.

13 Claims, 7 Drawing Sheets

LOADER FOR MAGNETIC TAPE CARTRIDGES

CROSS REFERENCE TO RELATED APPLICATIONS

This application is related to the following patent applications: Positioner for Magnetic Tape Cartridge Magazine, Ser. No. 488,723 filed on Mar. 5, 1990 Cartridges, Ser. No. 415,182 filed on Sept. 29, 1989; Autoloader Magazine for Tape Cartridges and Method Therefor, Ser. No. 414,704, filed on September 29, 1989.

FIELD OF THE INvENTION

This invention relates to tape drives that handle 3480 type magnetic tape cartridges and, in particular, to a loader apparatus that mechanically loads and unloads the 3480 type magnetic tape cartridges into and out of the associated tape drive from a receiver or a magazine that holds a plurality of cartridges.

PROBLEM

It is a problem in the field of 3480 type magnetic tape drives to efficiently load and unload the 3480 type magnetic tape cartridges into the associated tape drive using an automated loader. Previous methods and devices for loading the 3480 type magnetic tape cartridges into the tape drive generally involved three methods: using a library system equipped with a magnetic tape cartridge handling robot; manually loading the magnetic tape cartridges directly into the tape drive; or using a prior art magnetic tape cartridge autoloader.

An advantage of the robot library method is its ability to store a large number of magnetic tape cartridges and its ability to select any one of the magnetic tape cartridges in the library regardless of the order in which the cartridges are stacked. However, the use of such a magnetic tape cartridge robot library system (such as the Storage Technology Corporation 4400 Automated Cartridge System) is expensive and is therefore limited by its size and cost to large computer sites.

The method of manually loading individual 3480 type magnetic tape cartridges into an associated tape drive is expensive due to the extensive labor costs and the increased probability of damage to the magnetic tape cartridge through mishandling by the operator. In addition, this method is susceptible to errors, in that the operator may load the wrong magnetic tape cartridge into the associated drive. Furthermore, the transfer of data between the tape drive and the magnetic tape cartridges is slowed if the operator does not promptly change the magnetic tape cartridge upon the completion of a read or write operation.

There are presently available a number of mechanical autoloader devices that automatically load and unload a plurality of 3480 type magnetic tape cartridges into and out of the associated tape drive. One such apparatus utilizes a tractor drive system that sequentially feeds magnetic tape cartridges into the associated tape drive one at a time. This device is relatively large and cumbersome, approximately 16½ inches high and uses four motors to operate the system. The operator must individually load the magnetic tape cartridges one at a time into an associated slot in the tractor drive. The magnetic tape cartridges are moved in a downward direction only to the unloading position. There the magnetic tape cartridge is engaged by friction feed drive which drags the magnetic tape cartridge into position over the drive hub of the associated tape drive. The magnetic tape cartridge is then unloaded in the reverse fashion and dropped into a used cartridge tray. This autoloader is large in size and mechanically complex. In addition this autoloader is only able to move cartridges in one direction and is therefore unable to selectively access a particular cartridge from the stack of cartridges.

Another autoloader device is disclosed in U.S. Pat. Ser. No. 4,835,634 titled "Automatic Magnetic Tape Cartridge Stack Loader for Tape Drive Systems". This stack loader uses an input bin to hold a plurality of magnetic tape cartridges that can be loaded all at once by an operator. Again, this autoloader only moves the tape cartridges in a downward direction to the unloading position. The magnetic tape cartridges are sequentially fed from the input bin by a friction feed drive into position over the drive hub of the associated tape drive. The magnetic tape cartridge is unloaded in the reverse fashion and dropped into a tray that contains the used magnetic tape cartridges. This type of autoloader again moves the cartridges using a friction feed drive.

Therefore, there presently exists no inexpensive magnetic tape cartridge loading system that minimizes operator labor costs and uses a mechanically simple tape cartridge loading mechanism, that is bidirectional in nature.

SOLUTION

The above described problems are solved and a technical advance achieved in the field by the loader for magnetic tape cartridges of the present invention which uses a receiver that holds a single magnetic tape cartridge or a companion cartridge magazine that holds a plurality of preloaded magnetic tape cartridges to individually access any one of the plurality of magnetic tape cartridges held by the magazine. The loader of the present invention is able to move a magnetic tape cartridge from the receiver or a magazine into the associated tape drive without the use of a friction feed drive. The loader contains only one motor for loading a magnetic tape cartridge from the receiver or magazine into the associated tape drive. The width of the loader is equal to or less than the width of the associated tape drive so that two loader-tape drive units can be mounted side by side.

To accomplish this, the loader includes a magnetically coupled drive that uses a single motor to operate both the magnetic tape cartridge shuttle and elevator apparatus that loads the selected magnetic tape cartridge into the associated tape drive. The shuttle mechanism operates without the use of a friction drive and instead uses a positioning arm for positive magnetic tape cartridge handling. The magnetic coupling apparatus releases the positioning arm when the magnetic tape cartridge is loaded into the tape elevator to lower the loaded magnetic tape cartridge onto the drive hub of the tape drive. These above described mechanisms provide precise positive engagement of the magnetic tape cartridges to prevent misalignment of the magnetic tape cartridges.

DETAILED DESCRIPTION OF THE INVENTION

The loader for magnetic tape cartridges uses a receiver that holds a single magnetic tape cartridge or a companion cartridge magazine that holds a plurality of preloaded magnetic tape cartridges to individually access any one of the plurality of magnetic tape cartridges held by the magazine. The loader of the present invention is able to move a magnetic tape cartridge from the receiver or a magazine into the associated tape drive without the use of a friction feed drive. The loader contains only one motor for loading a magnetic tape cartridge from the receiver or magazine into the associated tape drive. The width of the loader is equal to or less than the width of the associated tape drive so that two loader-tape drive units can be mounted side by side. To accomplish this, the loader includes a magnetically coupled drive that uses a single motor to operate both the magnetic tape cartridge shuttle and elevator apparatus that loads the selected magnetic tape cartridge into the associated tape drive. The shuttle mechanism operates without the use of a friction drive and instead uses a positioning arm for positive magnetic tape cartridge handling. The magnetic coupling apparatus releases the positioning arm when the magnetic tape cartridge is loaded into the tape elevator to lower the loaded magnetic tape cartridge onto the drive hub of the tape drive. These above described mechanisms provide precise positive engagement of the magnetic tape cartridges to prevent misalignment of the magnetic tape cartridges.

Loader Architecture

Figure 1:
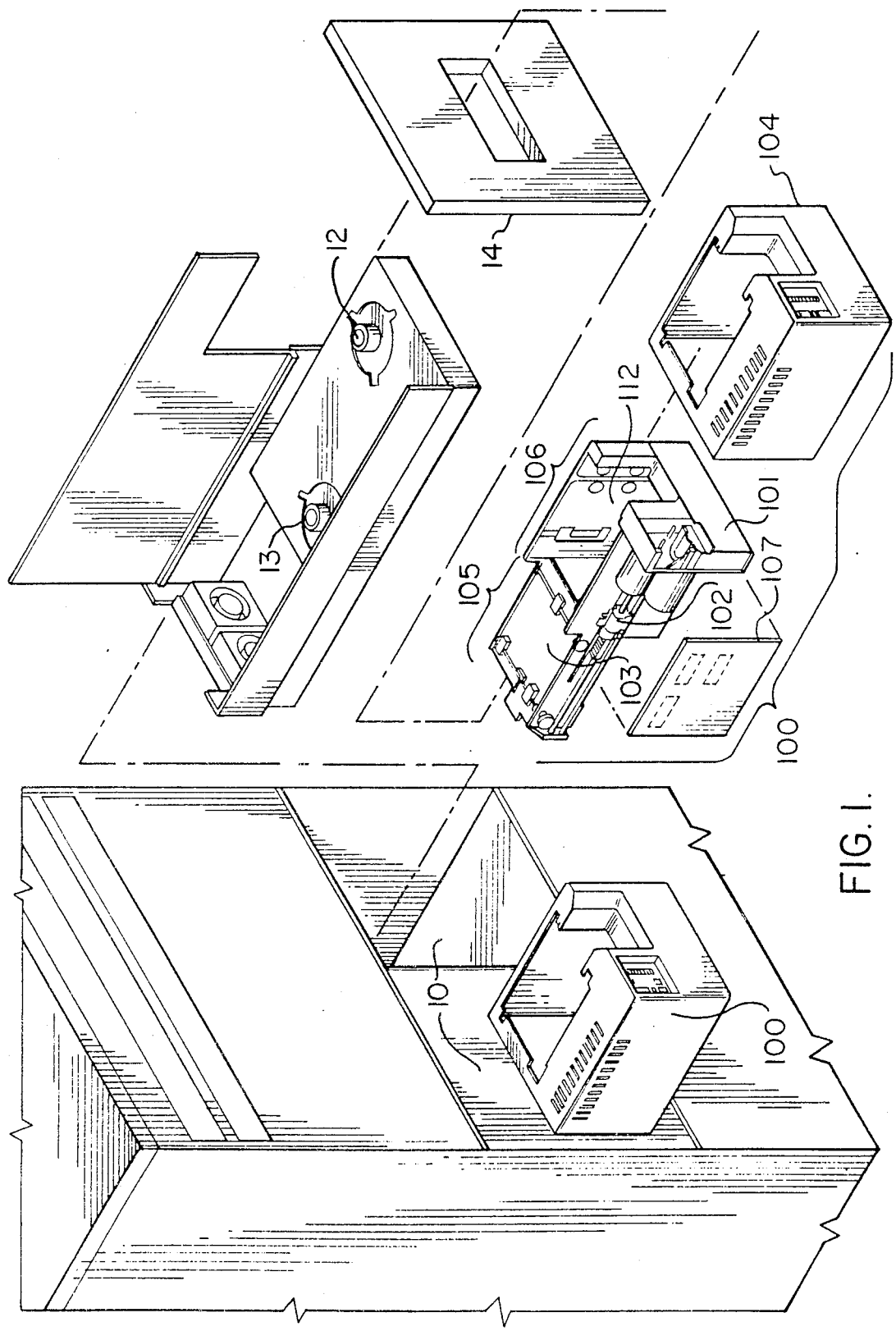
FIG. 1 is an exploded view of the loader of the present invention.
Figure 2:
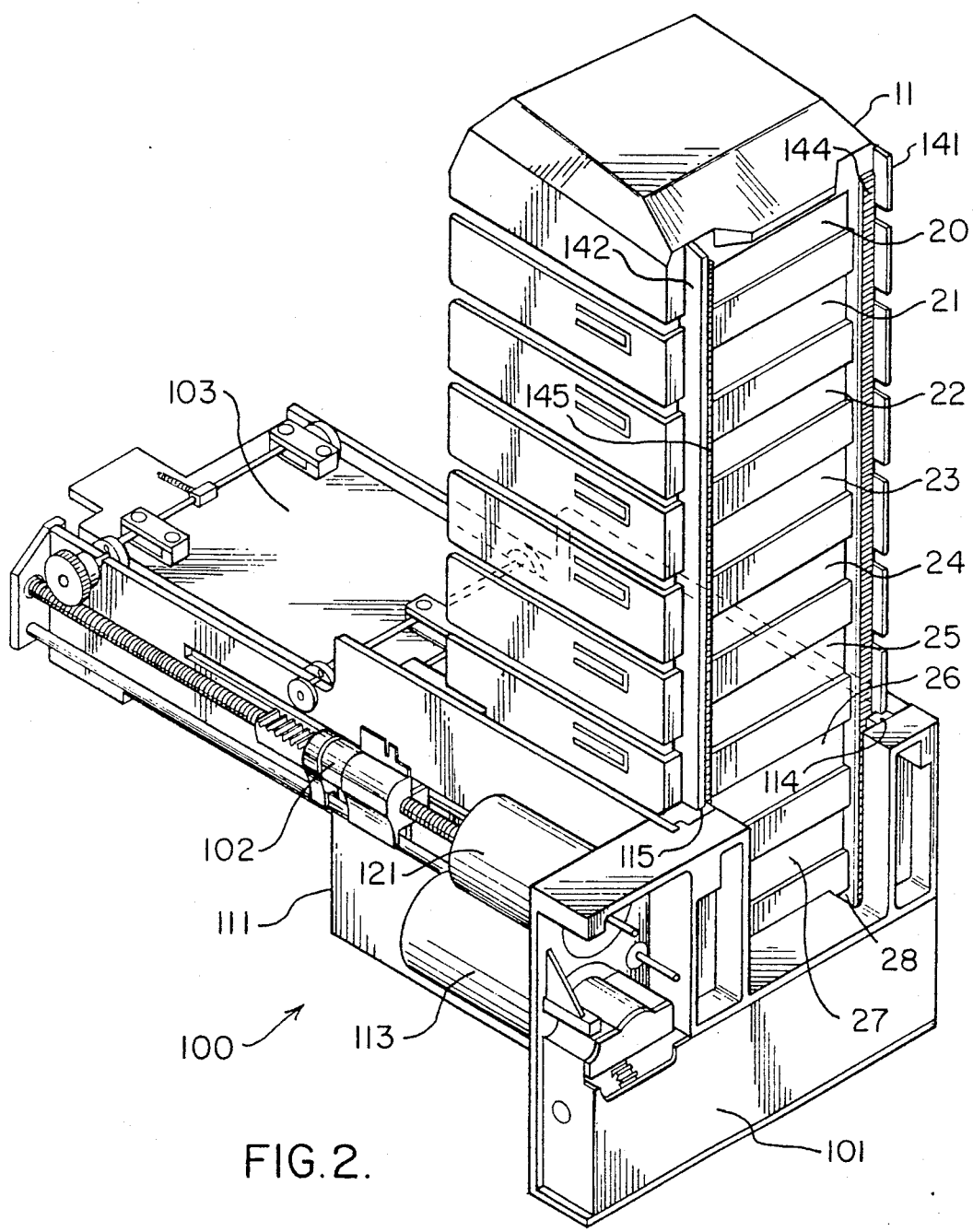
FIG. 2 is a front perspective view of the loader with a magnetic tape cartridge magazine inserted therein.

FIG. 2 illustrates a front perspective view of the loader for magnetic tape cartridges which is also equipped with the magazine positioning mechanism, while FIG. 1 illustrates an exploded view. As illustrated in FIG. 2, loader 100 is mounted on the front of an associated tape drive 10 and functions to load and unload 3480 type magnetic tape cartridges therefrom. Loader 100 operates in conjunction with a magazine positioner 101 and cartridge magazine 11 that is equipped to hold a plurality of magnetic tape cartridges 20-29. Cartridge magazine 11 illustrated in FIG. 2 contains ten 3480 type magnetic tape cartridges for illustration purposes only. The exact number of magnetic tape cartridges is a function of the particular magazine that is used. The associated tape drive 10 is a standard commercially available magnetic tape drive that is equipped to read and write data from 3480 type magnetic tape cartridges. Tape drive 10 contains the associated well known read and write circuitry (not shown) that is used for this purpose. The magnetic tape cartridge is typically loaded into the front of tape drive 10 and placed onto a drive hub 12 that functions with a take up reel 13 in well known fashion to transport the magnetic tape that is stored on the magnetic tape cartridge across the associated read/write heads of tape drive 10. This magnetic tape drive apparatus 10 is commercially available and well known to the art and is not disclosed herein for the purpose of simplicity.

Tape drive 10 is a unit that is typically 9 inches in width and can be mounted in a rack or premounted in a cabinet. Loader 100 is designed such that the width of loader 100 is equal to or less than the width of tape drive 10 in order that two loader equipped tape drive units can be placed side by side in a rack mount environment as shown in FIG. 1. Loader 100 as illustrated in FIGS. 1 and 2 is equipped with magazine positioner 101 that is a vertically loaded compact unit that mounts directly on the front of loader 100. Loader 100 contains a front portion 106 and a rear portion 105. The rear portion 105 fits through the opening in face plate 14 of the tape drive 10 and is positioned above the drive hub 12 for loading a magnetic tape cartridge on to drive hub 12. The front portion 106 is located exterior to tape drive 10 and is enclosed by cover 104.

The use of a magazine positioner 101 and cartridge magazine 11 with loader 100 enables loader 100 to access magnetic tape cartridges 20-29 loaded in cartridge magazine 11 in a selective fashion. That is, loader 100 can access the magnetic tape cartridges 20-29 in any particular sequence no matter how they are loaded in cartridge magazine 11. This is due to the fact that magazine positioner 101 is a bidirectionally operating apparatus that can move cartridge magazine 11 in a vertical direction either up or down to specifically access any selected one of magnetic tape cartridges 20-29 loaded in cartridge magazine 11. In addition, loader 100 is designed such that an individual magnetic tape cartridge can be loaded therein without the use of magazine positioner 101 and cartridge magazine 11.

In order to accomplish the above described feature, loader 100 consists of two primary sub-assemblies: shuttle 102 and elevator 103. These two primary sub-assemblies are driven by motor 121. In addition, the associated magazine positioner 101 includes motor 113 which functions to operate magazine positioner 101. In this fashion, motor 113 in magazine positioner 101 controls the vertical movement of the cartridge magazine 11 and its associated magnetic tape cartridges 20-29 while motor 121 in loader 100 is responsible for the horizontal movement of a selected magnetic tape cartridge that is to be transported between cartridge magazine 11 and drive hub 12 of the associated tape drive 10.

Magnetic Tape Cartridge Magazine/Magazine Positioner

Figure 5:
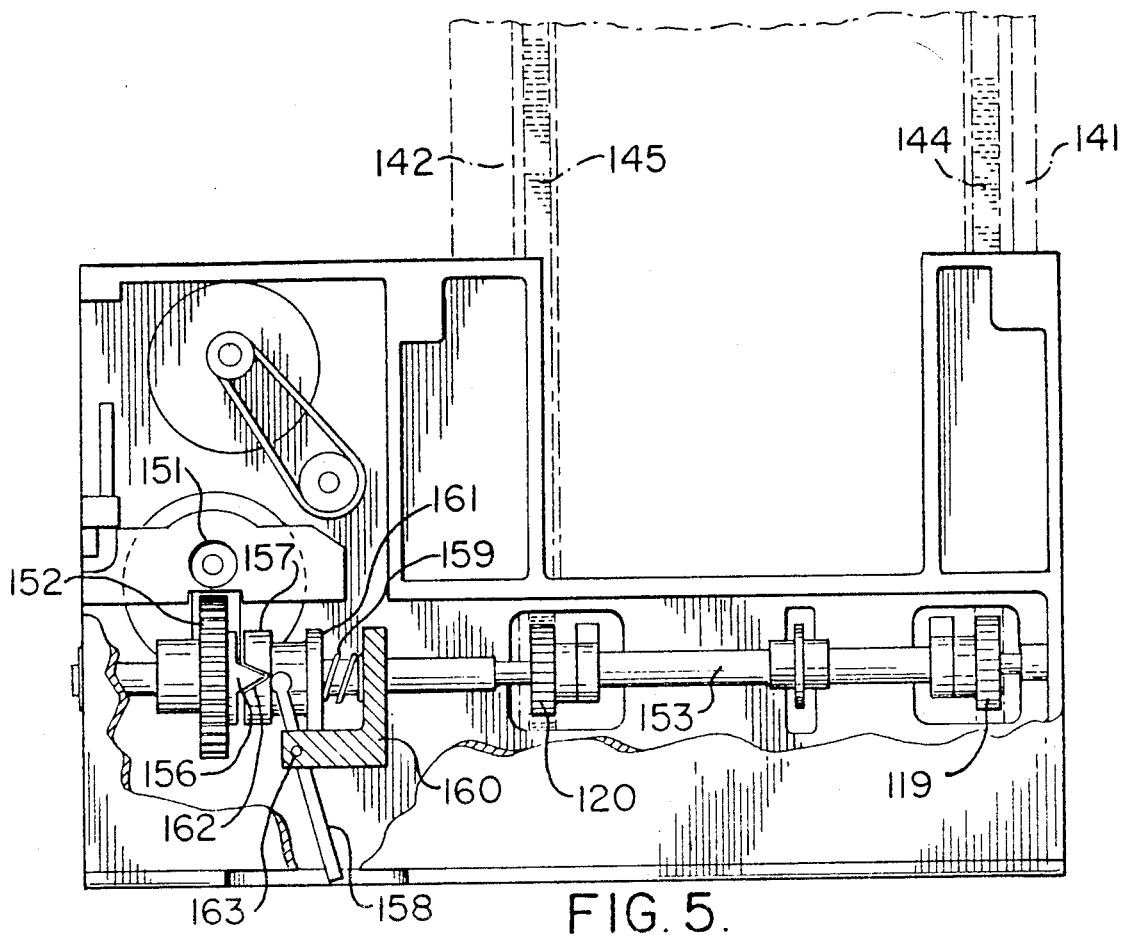
FIGS. 5-7 are detailed views of the magnetic tape cartridge magazine positioning apparatus.
Figure 6:
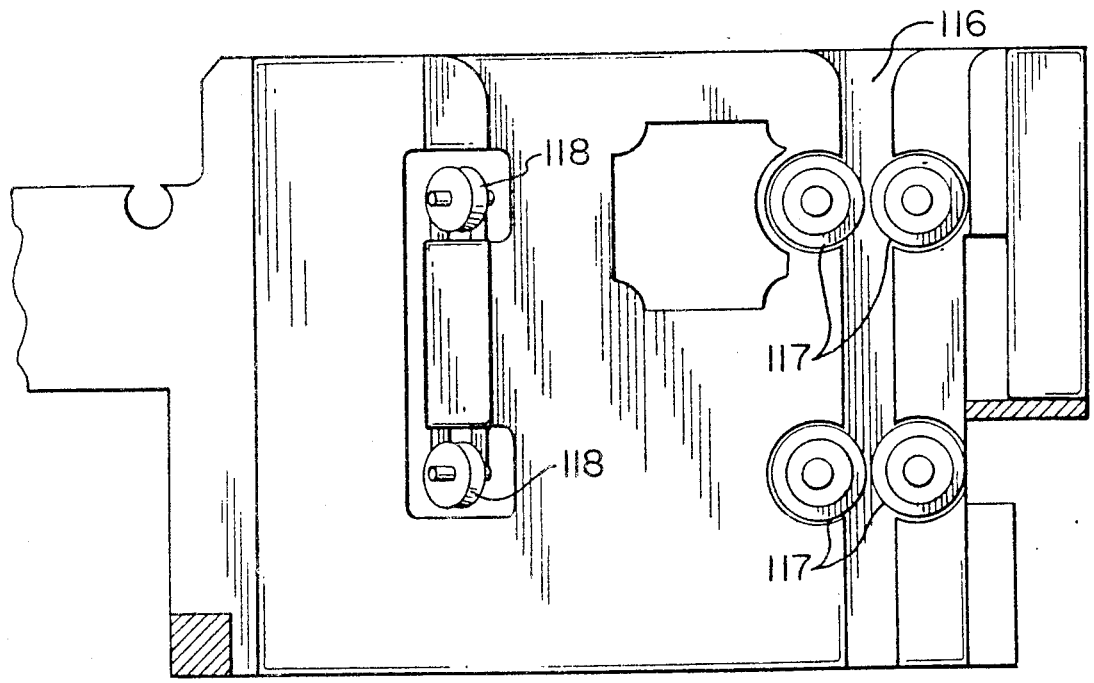
Figure 7:
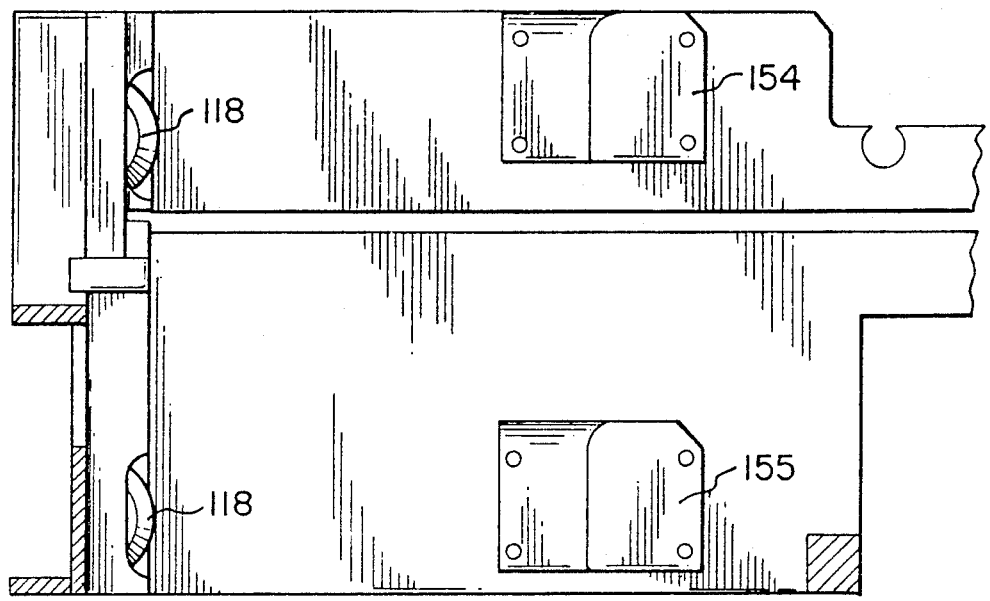

Magazine positioner 101 consists of a frame 111 that is shaped so as to form an opening 112 into which cartridge magazine 11 is inserted. Cartridge magazine 11 includes a plurality of guides shown in FIGS. 5-7 that are used to properly position and align cartridge magazine 11 inside of opening 112 so that the magazine tape cartridge shuttle 102 can accurately and properly retrieve a selected magnetic tape cartridge from cartridge magazine 11. Included in this plurality of guides are a pair of ribs 141, 142 located on both of the front corners of cartridge magazine 11 that fit into corresponding and mating front guides 114, 115 respectively. In addition, a rib 143 is located on one side of cartridge magazine 11 which rib 143 fits into corresponding slot 116 on the corresponding side of opening 112 in frame 111. Slot 116 is equipped with slot rollers 117 to provide rolling contact between rib 143 of cartridge magazine 11 and autoloader 100 rather than a friction sliding fit. In addition, angle rollers 118 are positioned on a 45° angle in both of the back corners of opening 112 to correspond to the back corners, right and left, of cartridge magazine 11 to thereby maintain proper right and left alignment of cartridge magazine 11 in opening 112 as well as proper front to back positioning of cartridge magazine 11 in opening 112.

Cartridge magazine 11 is equipped with a pair of racks 144, 145 located on the frontside thereof which mate with pinion gears 119, 120 located in the front of opening 112. Pinion gears 119, 120 operate with the corresponding rack 144, 145 in rack and pinion fashion to perform a vertical translation of cartridge magazine 11 in autoloader 100. Motor 113 provides the motive force for the operation of gears 119, 120. The output of motor 113 is a worm gear 151 that operates a corresponding drive gear 152 to turn the shaft 153 that supports drive gears 119, 120. A set of electronic control circuitry (not shown) and slots in ribs 141 and 142 are also provided to regulate the operation of motor 113 and thereby control the vertical positioning of cartridge magazine 11. A plurality of sensors 198, 199 are also provided to identify the vertical position of cartridge magazine 11 with respect to shuttle 102 of loader 100 and to determine whether a magnetic tape cartridge is present in a particular position in cartridge magazine 11. This position identification is accomplished by the use of a plurality of slots cut into rib 141, one located at each of the magnetic tape cartridges 20-29 in cartridge magazine 11. Sensor 198 detects the presence of each slot in rib 141 and the control circuit 107 can then precisely determine the position of cartridge magazine 11 in magazine positioner 101. There is also a single slot cut into the bottom of rib 142 so that sensor 199 can detect its presence, thereby providing a datum point indicative of the bottom of cartridge magazine 11.

A further feature of magazine positioner 101 is a clutch mechanism 156-162 that enables a user to disengage shaft 153 and gears 119, 120 from motor 113. The clutch mechanism 156-162 includes a tooth 156 on driving gear 152 that mates with a corresponding notch 162 on driver gear 157. The driving 152 and driven 157 gears are held together in proximate relationship by the action of spring 159, wound coaxially on shaft 153 and supported at one end by bracket 160. Driven gear 157 is decoupled from driving gear 152 by the operation of lever 158 which is pivotally (163) connected to bracket 160. Lever 158 engages lip 161 of driven gear 157 as lever 158 rotates around pivot 163, and compresses spring 159. When tooth 156 and notch 162 are disengaged, shaft 153 is free to rotate and cartridge magazine 11 can be manually moved in a vertical direction to remove it from magazine positioner 101. This feature is particularly significant when power is removed from magazine positioner 101. Without clutch mechanism 156-162, motor 113 and its associated drive gears 151, 152 would prevent shaft 153 from rotating, thereby locking cartridge magazine 11 in autoloader 100.

Shuttle Mechanism

Shuttle 102 provides a positive mechanical engagement with the magnetic tape cartridge (ex. 29) that is automatically positioned by magazine positioner 101 or manually placed in a receiving tray (not shown). This is accomplished by the use of a positioning arm 123. Positioning arm 123 is C-shaped arm that positively engages the front and back of the magnetic tape cartridge to provide the translation of the magnetic tape cartridge from cartridge magazine 11 or receiving tray (not shown) to elevator 103 of loader 100. Use of positioning arm 123 eliminates the need for a friction drive positioning apparatus as is used in prior art autoloaders. The use of a positive mechanical coupling such as positioning arm 123 reduces the possibility of the magnetic tape cartridge being mispositioned in elevator 103 or cartridge magazine 11/receiving tray. Furthermore, the use of positioning arm 123 simplifies the design of the magnetic tape cartridge position sensor that determines whether the magnetic tape cartridge is properly positioned for loading into elevator 103. Motor 121 is used to power both shuttle 102 and elevator 103. This is accomplished by motor 121 driving lead screw 122 which is connected to positioning arm 123 by way of a first segment 124 of magnetic coupling 124, 125.

Magnetic coupling 124, 125 includes a second segment 125 that contains a hole in the center, which hole is threaded to be in mating relationship with lead screw 122. Second segment 125 also includes runners 128 that ride on track 129 to prevent second segment 125 from rotating as lead screw 122 rotates. Therefore, runners 128 and track 129 maintain second segment 125 in a fixed position with respect to rotation around lead screw 122. As lead screw 122 rotates, second segment 125 translates along the length of lead screw 122 in a direction that is a function of the direction of rotation of lead screw 122.

First segment 124 of magnetic coupling 124, 125 is similar to second segment 125 in that it rides in runners 130 that ride on track 129, to prevent rotation around lead screw 122. However, first segment 124 does not contain any threads in the hole through which lead screw 122 is placed. First segment 124 is free to slide along the length of lead screw 122 independent of the rotation or lack thereof of lead screw 122.

Figure 3:
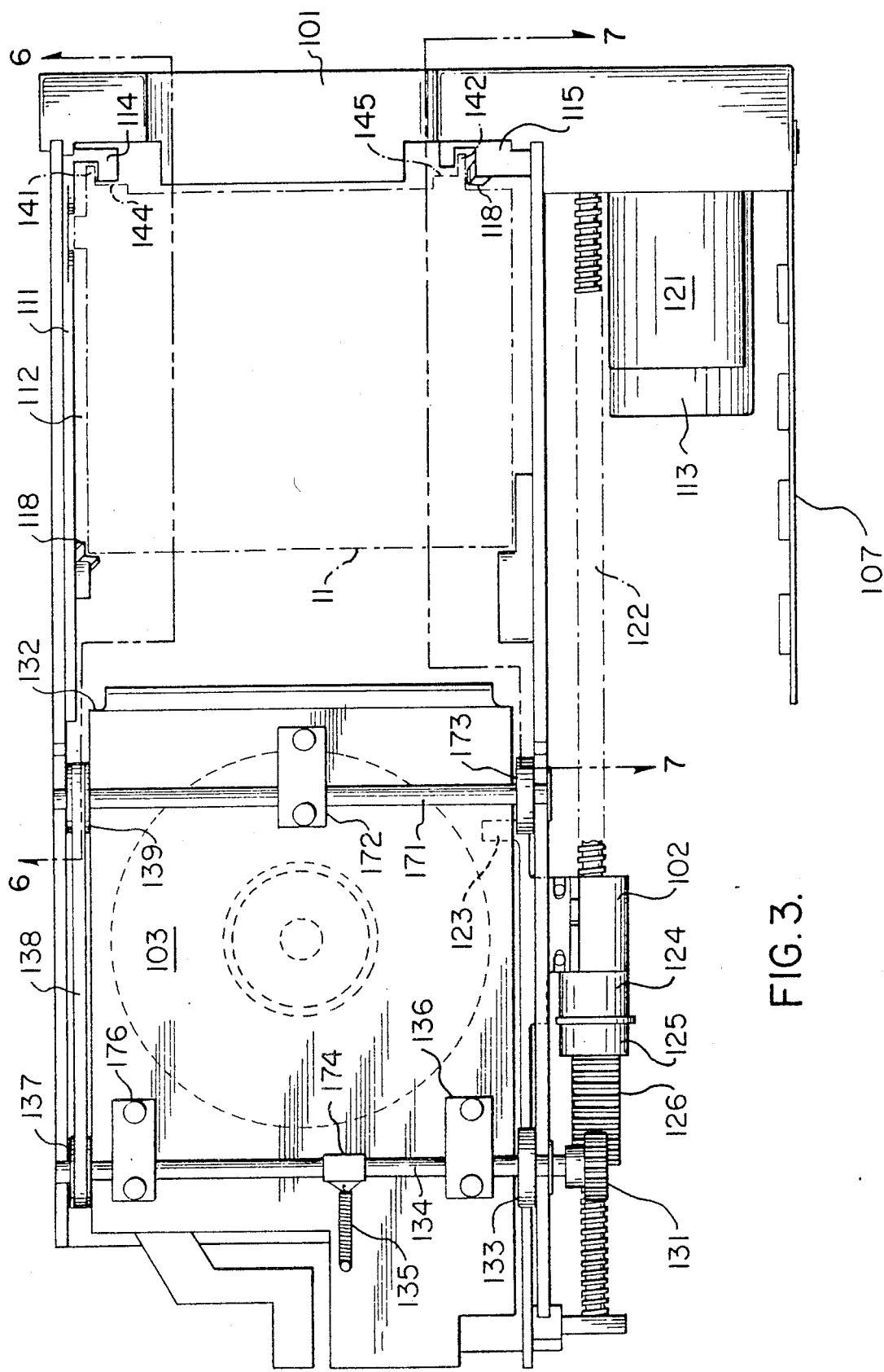
FIG. 3 is a top view of the loader.
Figure 4:
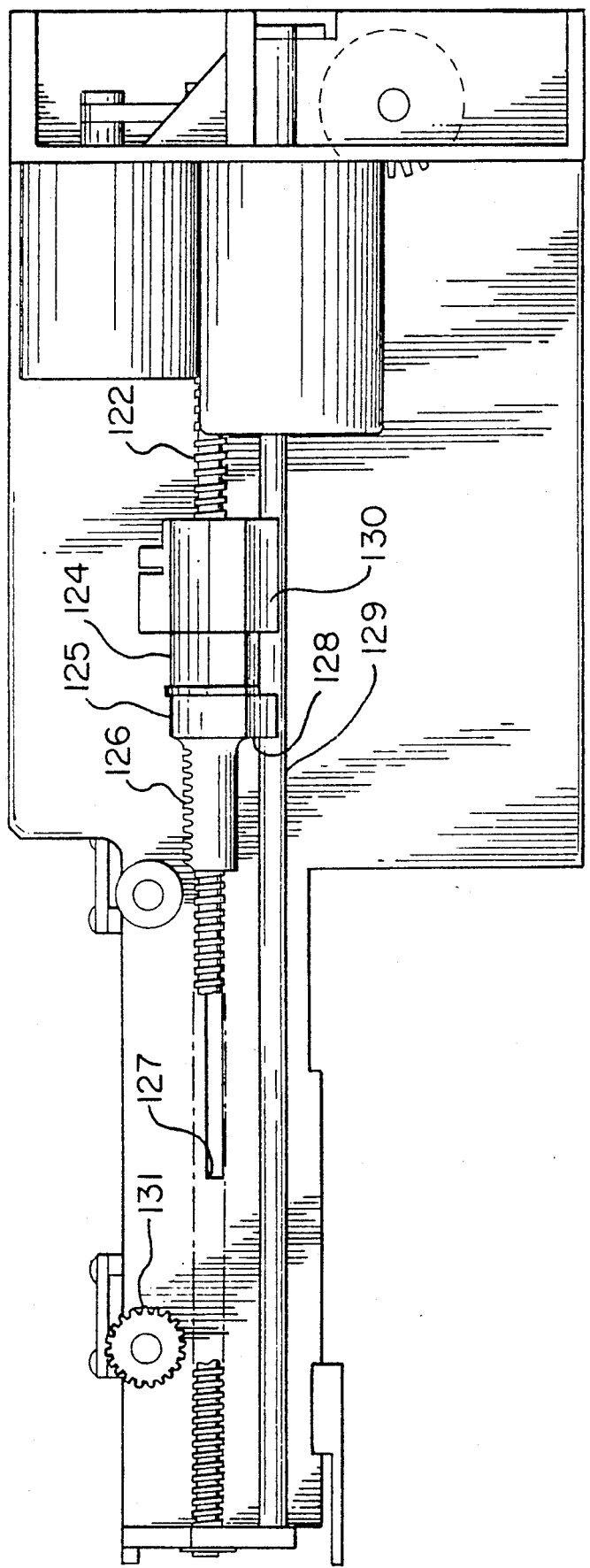
FIG. 4 is a side view of the loader.
Figure 8:
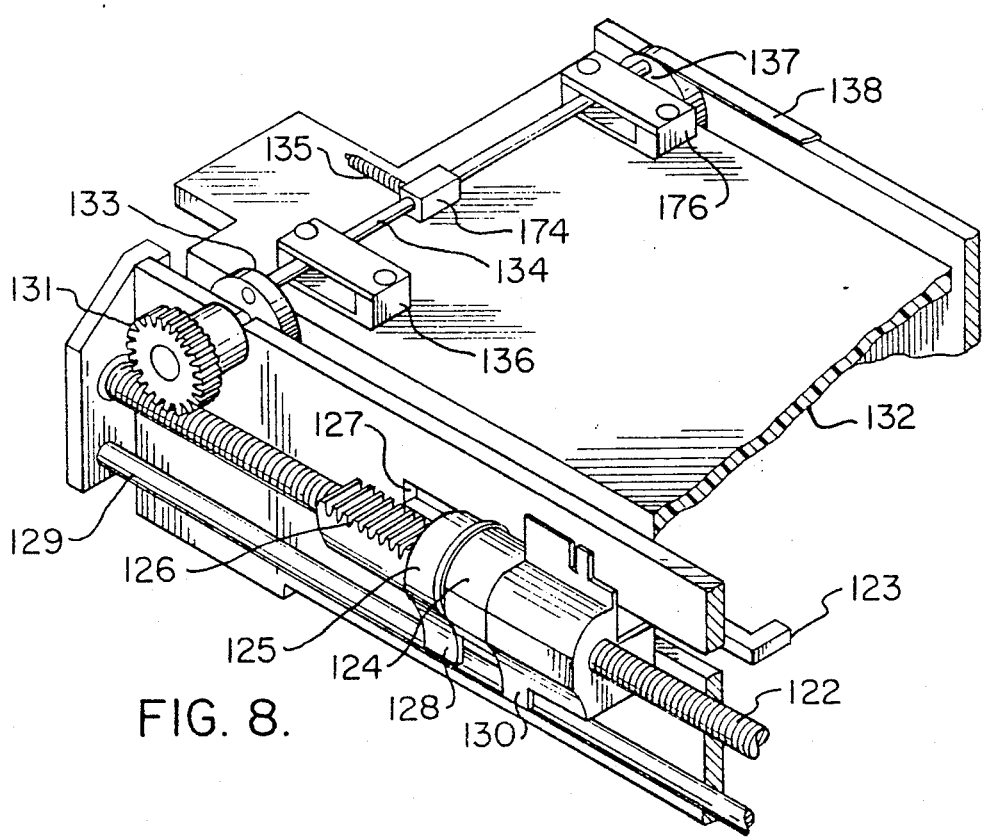
FIGS. 8-10 are detailed views of the magnetic tape cartridge shuttle and carrier apparatus.

In operation, first segment 125 and second segment 125 include a magnet (not shown) at their common interfacing sides. The magnet maintains first 124 and second 125 segments in juxtaposed relationship (as shown in FIGS. 3, 4, 8) by magnetic force. As lead screw 122 rotates, second segment 125 is laterally translated from magazine positioner 101 and receiving tray 199 toward elevator 103, carrying a magnetic tape cartridge in positioning arm 123. The magnetic force is sufficient to maintain first 124 and second 125 segments together. The second segment 125 of magnetic coupling 124, 125 continues its motion along lead screw 122 until positioning arm 123 properly seats the magnetic tape cartridge into elevator 123. At this point, a stop 127 blocks the further motion of magnetic tape cartridge and the magnetic coupling 124, 125. The continued revolutions of lead screw 122 cause the second segment 125 of the magnetic coupling 124, 125 to continue its lateral motion away from magazine positioner 101 and receiving tray 199 thereby overcoming the magnetic force that joins first 124 and second 125 segments, separating first segment 124 from second segment 125. Second segment 125 also contains a plurality of drive teeth 126 located along its top side. Drive teeth 126 are positioned such that the lateral motion of second segment 125 engages drive teeth 126 with elevator drive gears 131.

Elevator Mechanism

The use of a magnetic coupling 124, 125 enables motor 121 to use a single worm gear 122 to power both shuttle mechanism 102 and elevator mechanism 103. The use of magnetic coupling 124, 125 also provides a precisely controlled sequential and synchronized operation of shuttle 102 and elevator 103. The drive teeth 126 of the second segment 125 of magnetic coupling 124, 125 cause the rotation of elevator gears 131 which function to translate housing 132 in a downward direction to properly position the magnetic tape cartridge contained in elevator 103 on drive hub 12 of the associated tape drive 10.

Figure 9:
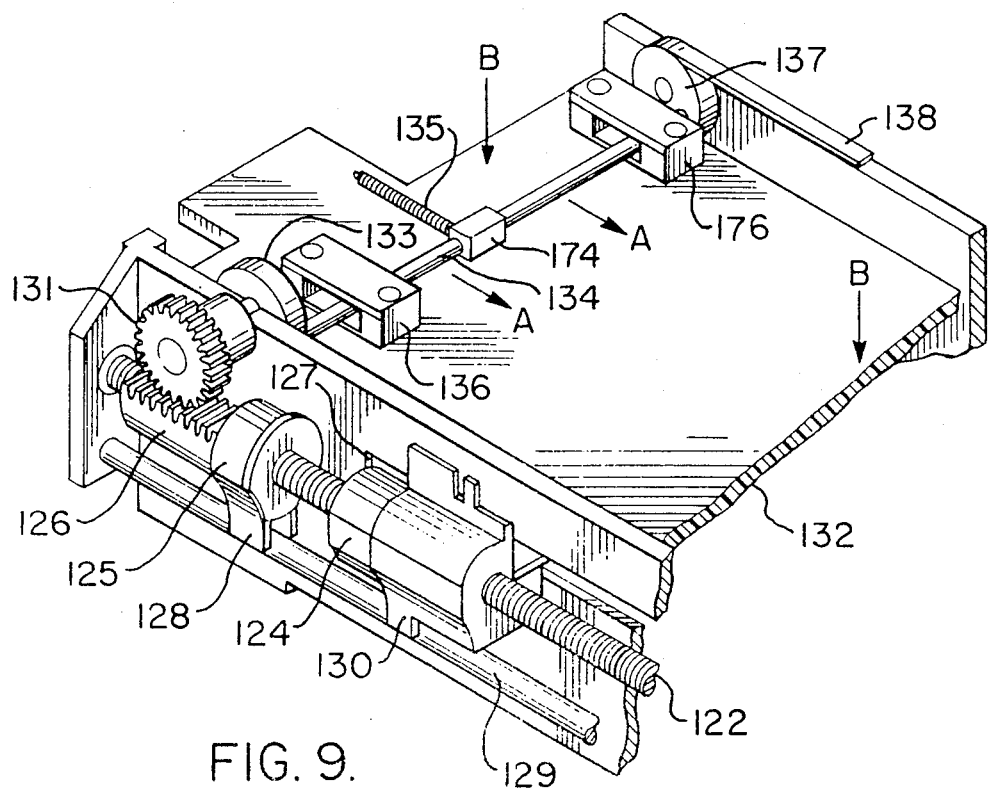
Figure 10:
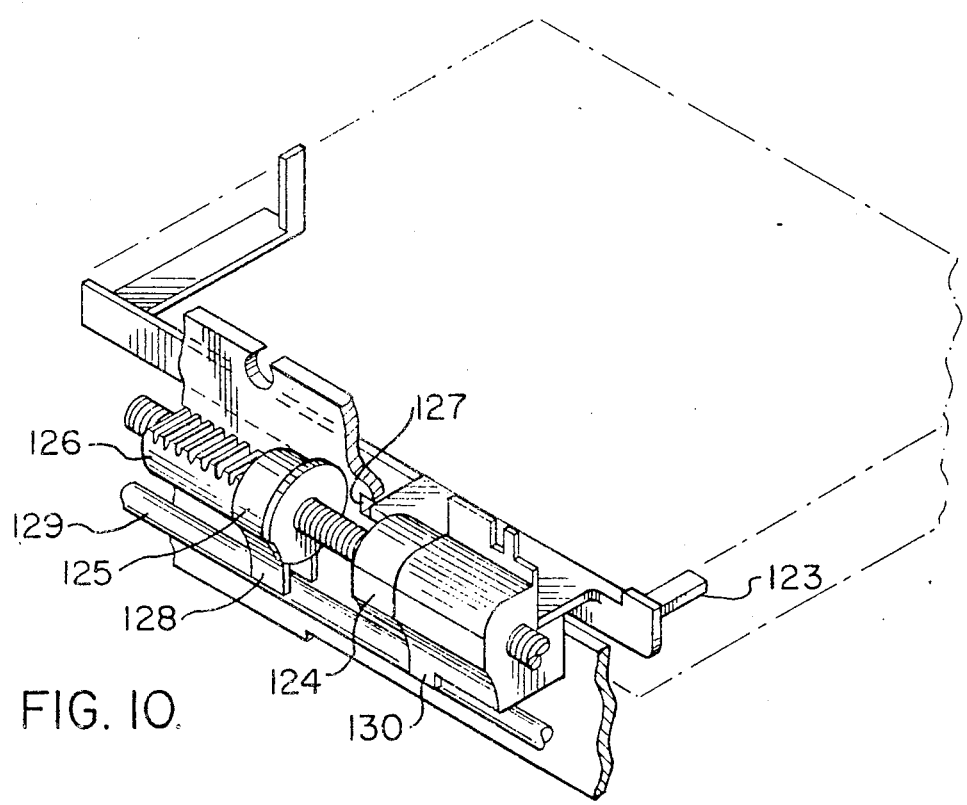

FIG. 3 provides a top view of elevator mechanism 103 while FIGS. 8-10 illustrate, in three steps, the operation of elevator mechanism 103 to load a magnetic tape cartridge on to drive hub 12. The lateral movement of second segment 125 causes drive teeth 126 to engage elevator drive gear 131 and rotate elevator drive gear 131 and its associated shaft 175 in a clockwise direction. The rotation of shaft 175 causes eccentric gear 133 to rotate in a clockwise direction as well as eccentric 137 via coupling shaft 134. Eccentric 137 is mechanically coupled via belt 138 to eccentric 139 which in turn is coupled to eccentric 173 via coupling shaft 171. Thus, the rotation of elevator drive gear 131 causes the concurrent rotation of eccentrics 133, 137, 139, 173 and the eccentric motion of coupling shafts 134, 171. The coupling shafts 134, 171 are mechanically linked to housing 132 via brackets 136, 176, 172, and are free to move in direction A Within brackets 136, 176, 172. The eccentric rotation of coupling shafts 134, 171 causes the movement of housing 132 in a direction indicated by arrow B on FIG. 9. The sequence of FIGS. 8-10 illustrate the downward motion of housing 132 as drive gears 126 cause the rotation of elevator drive gear 131. Spring 135 is coupled to coupling shaft 134 via block 174 to firmly seat housing 132 in its fully elevated and fully descended positions.

Thus, shuttle mechanism 102 and elevator mechanism 103 operate independently yet cooperatively in synchronization to laterally translate the magnetic tape cartridge from the cartridge magazine 11 to elevator mechanism 102 and to then provide the vertical positioning of the magnetic tape cartridge onto drive hub 12. Each of the sub-assemblies of loader 100 are bidirectional in operation.

Summary

Magazine positioner 101 can be attached to loader 100 to selectively translate an associated cartridge magazine 11 up or down in the vertical direction to automatically access any of the cartridge slots in cartridge magazine 11. Alternatively, magnetic tape cartridges can be manually loaded into a receiving tray 199. Shuttle mechanism 102 retrieves a magnetic tape cartridge from either cartridge magazine 11 or receiving tray 199 and transports it to elevator mechanism 103 or transports the magnetic tape cartridge from elevator mechanism 103 to cartridge magazine 11 or receiving tray 199. Elevator mechanism 103 loads a magnetic tape cartridge received from shuttle mechanism 102 onto drive hub 12 or removes the magnetic tape cartridge from drive hub 12 and places this retrieved magnetic tape cartridge into shuttle mechanism 102. These two interactively cooperative yet independent sub-assemblies use only one motor to operate the entire loader 100. This enables the loader 100 to be constructed within the constraint that the width of the loader 100 must be less than or equal to the width of the associated tape drive 10.

While a specific embodiment of this invention has been disclosed, it is expected that those skilled in the art can and will design alternate embodiments of this invention that fall within the scope of the appended claims.

I claim:

1. A magnetic tape cartridge loading apparatus, connected to an associated tape drive, said tape drive having an opening through which said loading apparatus can access a drive hub located in said tape drive, for transferring a magnetic tape cartridge between a magnetic tape cartridge eject position in said loading apparatus and said drive hub, comprising:
   means, located external to said associated tape drive, for receiving a magnetic tape cartridge placed therein by an operator, said receiving means corresponding to said eject position of said magnetic tape cartridge;
   means for lowering said magnetic tape cartridge on to said drive hub;
   means for transporting said magnetic tape cartridge between said receiving means and said lowering means;
   motor means for powering both said lowering means and said transporting means; and
   means for sequentially coupling said motor means to said transporting means and said lowering means, including:
   threaded drive shaft means having first and second ends and oriented parallel to said channel means a fixed distance therefrom, said first end being coupled to said motor means for rotating said threaded drive shaft means;
   magnetic clutch means including:
     first segment means having a threaded hole therethrough, said threaded hole mating with said threaded drive shaft means for transporting said magnetic clutch between said first and second ends of said threaded drive shaft means in response to the rotation of said threaded drive shaft means, for powering said loading means,
     second segment means magnetically coupled to said first segment means and having a hole therethrough for freely sliding along said threaded shaft means between said first and second ends of said threaded drive shaft means in response to the movement of said first segment means along said threaded drive shaft means, for powering said transporting means.

2. The apparatus of claim 1 wherein said transporting means includes:
   channel means for providing a substantially confined path for the movement of said magnetic tape cartridge between said receiving means and said lowering means; and
   means for guiding said magnetic tape cartridge along said channel means between said receiving and said lowering means.

3. The apparatus of claim 1 further comprising:
   means for coupling said second segment means to said transporting means to cause said transporting means to follow the movement of said second segment means along said threaded drive shaft means.

4. The apparatus of claim 3 further comprising:
   rack means mounted on said first segment means; and
   gear means engagable with said rack means and rotating in response to said movement of said first segment means along said threaded drive shaft means for activating said lowering means to place said magnetic tape cartridge on to said drive hub.

5. The apparatus of claim 4 further including:
   means for blocking the movement of said second segment means along said threaded drive shaft means a predetermined distance from said second end, said predetermined distance corresponding to said magnetic tape cartridge being positioned by said transporting means in said lowering means, causing said first and second segment means to magnetically decouple as said first segment means continues its movement along said threaded drive shaft means toward said second end.

6. The apparatus of claim 5 wherein said gear means is positioned to engage said rack means in a location along said threaded drive shaft past the location of said blocking means such that said first and second segment means are decoupled when said rack means engages said gear means.

7. A magnetic tape cartridge loader apparatus for transferring a magnetic tape cartridge between a magnetic tape cartridge eject position in said magnetic tape cartridge loader apparatus and an associated tape drive of width w, said tape drive having an opening through which said loader apparatus can access a drive hub contained therein comprising:

means, located external to said associated tape drive and of width less than or equal to w, for receiving a magnetic tape cartridge placed therein by an operator, said receiving means corresponding to said eject position of said magnetic tape cartridge;

means, located in said opening, for lowering said selected magnetic tape cartridge to said drive hub;

means, having a width less than or equal to w, for transporting said magnetic tape cartridge between said receiving means and said lowering means;

motor means for powering both said lowering means and said transporting means; and means for sequentially coupling said motor means to said transporting means and said lowering means, including:

threaded drive shaft means having first and second ends and oriented parallel to said channel means a fixed distance therefrom, said first end being coupled to said motor means for rotating said threaded drive shaft means;

magnetic clutch means including:

first segment means having a threaded hole therethrough, said threaded hole mating with said threaded drive shaft means for transporting said magnetic clutch between said first and second ends of said threaded drive shaft means in response to the rotation of said threaded drive shaft means, for powering said loading means, and second segment means magnetically coupled to said first segment means and having a hold therethrough for freely sliding along said threaded shaft means between said first and second ends of said threaded drive shaft means in response to the movement of said first segment means along said threaded drive shaft means, for powering said transporting means.

8. The apparatus of claim 7 wherein said transporting means includes:

channel means for providing a substantially confined path for the movement of said magnetic tape cartridge between said receiving means and said lowering means; and means for guiding said magnetic tape cartridge along said channel means between said receiving means and said lowering means.

9. The apparatus of claim 7 further comprising:

means for coupling said second segment means to said transporting means to cause said transporting means to follow the movement of said second segment means along said threaded drive shaft means.

10. The apparatus of claim 9 further comprising:

rack means mounted on said first segment means; and gear means engagable with said rack means and rotating in response to said movement of said first segment means along said threaded drive shaft means for activating said lowering means to place said magnetic tape cartridge on to said drive hub.

11. The apparatus of claim 10 further including:

means for blocking the movement of said second segment means along said threaded drive shaft means a predetermined distance from said second end, said predetermined distance corresponding to said magnetic tape cartridge being positioned by said transporting means in said lowering means, causing said first and second segment means to magnetically decouple as said first segment means continues its movement along said threaded drive shaft means toward said second end.

12. The apparatus of claim 11 wherein said gear means is positioned to engage said rack means in a location along said threaded drive shaft past the location of said blocking means such that said first and second segment means are decoupled when said rack means engages said gear means.

13. A magnetic tape cartridge loading apparatus, connected to an associated tape drive, said tape drive having an opening through which said loading apparatus can access a drive hub located in said tape drive, for transferring a magnetic tape cartridge between a magnetic tape cartridge eject position in said loading apparatus and said drive hub, comprising:

means, located external to said associated tape drive, for receiving a magnetic tape cartridge placed therein by an operator, said receiving means corresponding to said eject position of said magnetic tape cartridge;

means for lowering said magnetic tape cartridge on to said drive hub;

means for transporting said magnetic tape cartridge between said eject position in said receiving means and said lowering means, including:

channel means for providing a substantially confined path for the movement of said magnetic tape cartridge between said receiving means and said lowering means, means for guiding said magnetic tape cartridge along said channel means between said receiving means and said lowering means;

motor means for powering both said lowering means and said transporting means;

means for linking said motor means to said transporting means; and means for linking said motor means to said lowering means;

means for magnetically coupling said transporting linking means to said lowering linking means.

* * * * *